Dec. 23, 1947.　　　I. A. OVERACKER　　　2,433,149
BUILDING BLOCK
Filed Aug. 29, 1945　　　2 Sheets-Sheet 1

Inventor
Ida A. Overacker

By Clarence A. O'Brien
and Harvey B. Jacobson
Attorneys

Dec. 23, 1947.   I. A. OVERACKER   2,433,149
BUILDING BLOCK
Filed Aug. 29, 1945   2 Sheets-Sheet 2
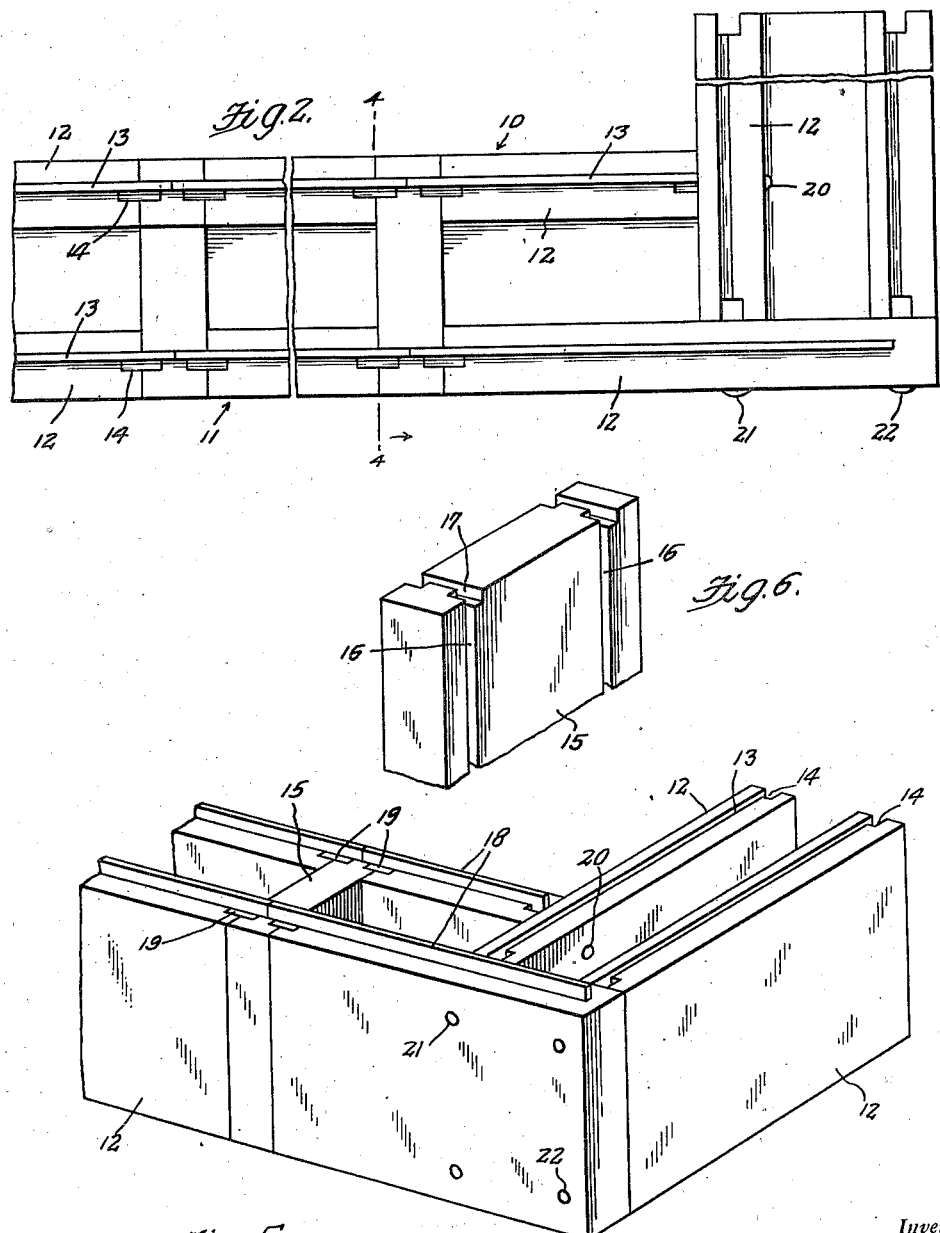

Patented Dec. 23, 1947

2,433,149

UNITED STATES PATENT OFFICE 2,433,149

BUILDING BLOCK

Ida A. Overacker, Klickitat, Wash.

Application August 29, 1945, Serial No. 613,250

1 Claim. (Cl. 20—4)

This invention relates to a building structure and more particularly to the construction of a building wall.

The primary object of the invention is to make use of scrap materials such as those commonly found around saw mills, and like wood working establishments, and apply such scrap to a useful purpose.

Among its features, my invention embodies a building structure comprising inner and outer spaced walls, each of which is formed of blocks made from scrap lumber arranged in aligned relation and having aligning grooves in their upper and lower edges, said blocks also having grooves in their end edges perpendicular to but offset with relation to the first mentioned grooves, bonding blocks extending transversely between the inner and outer wall members and being positioned between the ends of the aligning blocks forming the wall members, said bonding blocks having grooves in opposite spaces adjacent opposite ends which are adapted to align with the grooves in the ends of the aligned blocks and bonding strips lying in the grooves and forming an interlock between the various blocks to hold the wall members in spaced parallel relation.

In the drawings:

Figure 2 is a top plan view of the wall illustrated in Figure 1,

Figure 5 is a fragmentary perspective view of one of the corner members showing the manner in which the bonding strips are employed, and Figure 6 is a perspective view of one of the bonding blocks.

Figure 1:
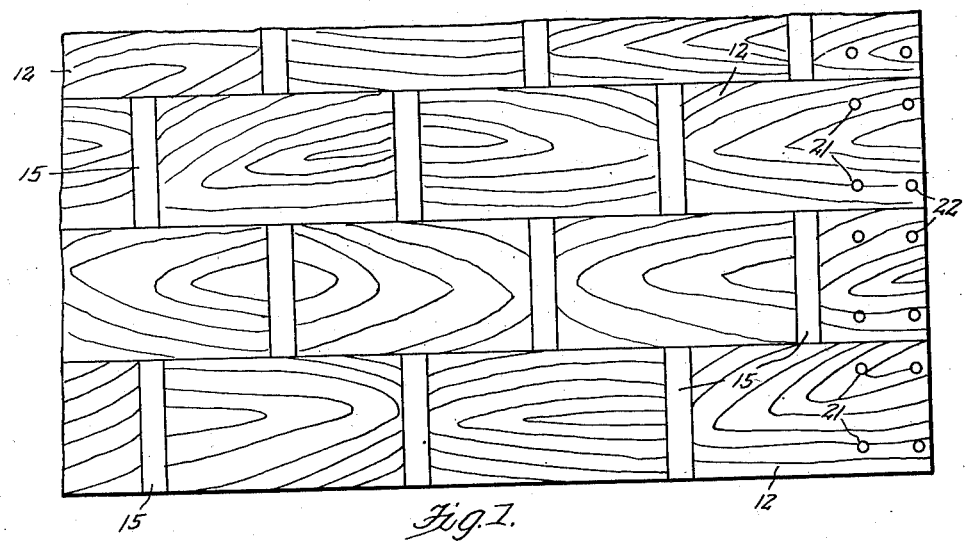
Figure 1 is a fragmentary side view of a wall embodying the features of this invention.
Figure 3:
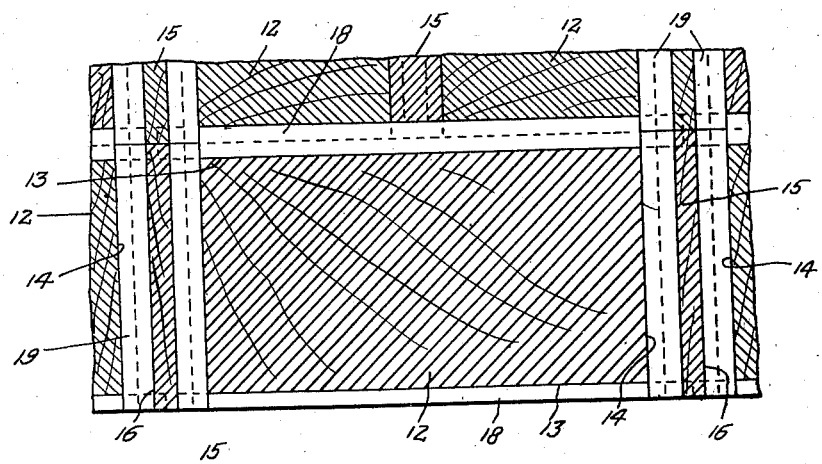
Figure 3 is a fragmentary vertical sectional view on an enlarged scale through certain of the blocks illustrated in Figure 1.
Figure 4:
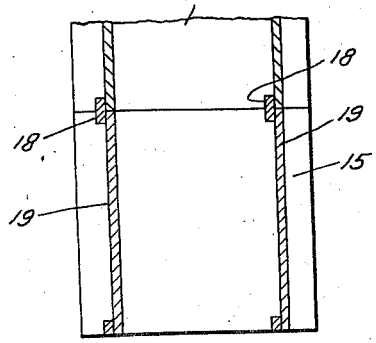
Figure 4 is a transverse sectional view taken on the line 4—4 of Figure 2.

Referring to the drawings in detail my improved building construction comprises an inner wall designated generally 10 and an outer wall designated generally 11. Each of these wall members is composed of a plurality of aligned blocks 12, each of which is formed in its upper and lower side edges with longitudinally extending grooves 13 which are arranged in alignment with the grooves in the next adjacent block. Each block 12 is also provided in each end edge with a groove 14 which extends perpendicular to but is offset with relation to the grooves 13 as will be readily understood upon reference to Figure 2. Extending transversely between the wall members 10 and 11 formed of the aligned blocks 12 are bonding blocks 15 each of which comprises a rectangular body having adjacent opposite ends and on opposite side faces grooves 16 which when the bonding block is in position in the wall align with the grooves 14 in the ends of the blocks 12. Transversely extending grooves 17 are formed in the upper and lower edges of the blocks 15 and as illustrated in Figure 6, are offset so that when the blocks 15 are in position in the wall the grooves 17 will align with the grooves 13.

In order to hold the blocks 12 of the wall members 10 and 11 in proper alignment, bonding strips 18 are laid in the grooves 13 and are of such a width that they project upwardly into the grooves 13 in the bottoms of the blocks 12 forming the next adjacent course. Bonding strips 19 lie in the grooves 16 and are of such a width as to extend into the grooves 14 formed in the ends of the blocks 12 to form an interlock with the bonding blocks 15 and hold the parts properly assembled.

As illustrated in Figures 2 and 5, it is a simple matter to build a corner block through the simple expedient of sawing one of the blocks 12 in two and nailing or otherwise securing as at 20 a block 12 perpendicular to the block 12 which has been sawed in two. The perpendicular block 12 is nailed or otherwise secured as at 21 to a block 12 forming the outer wall 11 and attached adjacent the outer end of the latter block as at 22 is a block 12 which lies in spaced parallel relation to the perpendicular block 12. It will thus be seen that a corner block may readily be constructed from the units above described by the simple expedient of sawing one of the blocks in two and nailing them together as illustrated.

From the foregoing it will be obvious that by the mere grooving of the waste blocks and cutting them to proper size, they may be usefully employed in the construction of a building having an inner and an outer wall arranged in spaced parallel relation with suitable bonding blocks extending therebetween.

While in the foregoing there has been shown and described the preferred embodiment of this invention it is to be understood that minor changes in the details of construction, combination, and arrangement of parts may be resorted to without departing from the spirit and scope of the invention as claimed.

What I claim is:

A wall structure comprising inner and outer spaced parallel walls each formed of a plurality of aligned rectangular blocks having aligning grooves in their upper and lower side edges and having grooves in their end edges perpendicular to but offset from the grooves in the side edges, bonding blocks extending from wall to wall between the adjacent end edges of the aligned blocks of each wall, said bonding blocks being of uniform thickness throughout and having grooves in opposite side faces adjacent each end, said grooves aligning with the grooves in the end edges of the aligned blocks and each bonding block having transversely extending grooves in the top and bottom edges aligning with the aligning grooves in the top and bottom side edges of the aligned blocks, horizontal bonding strips fitted in the grooves in the side edges of the wall forming blocks and in the grooves in the end edges of the bonding blocks to hold adjacent blocks in wall forming alignment, and vertical bonding strips fitted in the grooves in the ends of the wall forming blocks and the grooves in the side faces of the bonding blocks to hold the inner and outer walls in spaced parallel relation.

IDA A. OVERACKER.

REFERENCES CITED

The following references are of record in the file of this patent:

UNITED STATES PATENTS

| Number | Name | Date |
|---|---|---|
| 14,208 | Terry | Feb. 5, 1856 |
| 698,727 | McClenahan | Apr. 29, 1902 |
| 1,315,142 | Mason | Sept. 2, 1919 |
| 2,107,691 | Corser | Feb. 8, 1938 |